US007336631B2

(12) United States Patent
Okubo

(10) Patent No.: US 7,336,631 B2
(45) Date of Patent: Feb. 26, 2008

(54) RADIO NETWORK SYSTEM AND RADIO COMMUNICATION CONTROL METHOD

(75) Inventor: Akira Okubo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 657 days.

(21) Appl. No.: 10/479,215

(22) PCT Filed: Mar. 29, 2002

(86) PCT No.: PCT/JP02/03155

§ 371 (c)(1),
(2), (4) Date: Dec. 1, 2003

(87) PCT Pub. No.: WO03/084269

PCT Pub. Date: Oct. 9, 2003

(65) Prior Publication Data

US 2004/0156334 A1    Aug. 12, 2004

(51) Int. Cl.
*H04Q 7/00* (2006.01)
(52) U.S. Cl. .................. 370/329; 370/352; 455/452.1; 455/453
(58) Field of Classification Search ................ 370/329, 370/352, 353, 356; 455/452.1, 452.2, 453
See application file for complete search history.

(56) References Cited

U.S. PATENT DOCUMENTS 5,859,838 A * 1/1999 Soliman ..................... 370/249
2002/0089949 A1* 7/2002 Bjelland et al. ............ 370/331
2003/0076803 A1* 4/2003 Chuah ........................ 370/338

FOREIGN PATENT DOCUMENTS

| JP | 7-508379 | 9/1995 |
|----|----------|--------|
| JP | 2000-197094 | 7/2000 |
| JP | 2000-224649 | 8/2000 |
| JP | 2001-16275 | 1/2001 |
| JP | 2001-177861 | 6/2001 |
| JP | 2001-197542 | 7/2001 |
| JP | 2001-197543 | 7/2001 |
| JP | 2001-197544 | 7/2001 |
| JP | 2001-211470 | 8/2001 |
| JP | 2001-211471 | 8/2001 |
| WO | WO 94/00959 | 1/1994 |
| WO | WO 01/86988 A1 | 11/2001 |

OTHER PUBLICATIONS

U.S. Appl. No. 10/479,215, filed Dec. 1, 2003, Okubo.
U.S. Appl. No. 10/557,464, filed Nov. 18, 2005, Okubo.

* cited by examiner

*Primary Examiner*—Lee Nguyen
(74) *Attorney, Agent, or Firm*—Oblon, Spivak, McClelland, Maier & Neustadt, P.C.

(57) ABSTRACT

It is aimed to obtain a radio network system in which load sharing among a plurality of Radio Bearer Servers which performs data transfer control between a user plane (Bearer Plane) and a mobile terminal can be efficiently performed. In the radio network system, the plurality of Radio Bearer Servers always notifies a plurality of Radio Control Servers of a resource (channel) using state, and a Radio Control Server (6a) which controls receiving a new call assigns the new call to a Radio Bearer Server (4a) whose resource (channel) has the largest empty space, by judging a using state of each Radio Bearer Server based on the resource (channel) using states.

16 Claims, 11 Drawing Sheets

RADIO NETWORK SYSTEM AND RADIO COMMUNICATION CONTROL METHOD

TECHNICAL FIELD

The present invention relates to a radio network system aiming at load sharing among a plurality of radio bearer servers.

BACKGROUND ART

There is an increased demand for mobile communication in recent years. Particularly, in IMT (International Mobile Telecommunication)-2000 which is regarded as the third generation mobile communications system, realizing high speed and wide area has been incomparably proceeded. Accordingly, it is expected in mobile environment to greatly utilize the multimedia communication such as a dynamic image, by making use of features of the IMT-2000

Under these circumstances, a study of a radio network system whose sharing form is rich in flexibility, pliability, and expandability has been advanced. For example, in Mobile Wireless Internet Forum, the technical report "MTR-007 Open RAN Architecture in the third Generation Mobile Systems Release v1.0.0 (12 Jun. 2001)" was defined.

FIG. 11 is a block diagram showing a functional model of the radio network system in the technical report MTR-007 Open RAN Architecture in the third Generation Mobile Systems Release v1.0.0 (12 Jun. 2001).

In FIG. 11, 30 denotes a radio base station, called Node B, of the third generation mobile communication system. 31 denotes a radio layer 1 which performs notification of system information, investigation of a radio environment, coding/decoding of a radio channel, detection of a random access, measurement of an up-outerloop electric power, control of a down-outerloop electric power, and control of an up-innerloop electric power.

32 denotes an RNC (Radio Network Controller) which is divided into a Control/Drift RNC (Radio Network Controller) 33 and a Serving RNC (Radio Network Controller) 34. The Control/Drift RNC (Radio Network Controller) 33 has each function of 35 through 39 shown below. The Serving RNC (Radio Network Controller) 34 has each function of 39 through 41 shown below.

The Control/Drift RNC 33 performs a control for a common channel. The Serving RNC 34 performs a control for an individual channel.

35 denotes a Cell Bearer Gateway which performs multiplex/separation of a common channel, and broadcast/multicast transmission of a radio bearer.

36 denotes a Cell Controller which performs an assignment and a congestion control concerning a radio resource, an assignment of an individual physical radio resource, an assignment of a common logical radio resource, an assignment and a configuration management of a dynamic common physical resource, a control of a system information notification, a cell environment measurement collection, an assignment of a dynamic channel, cell paging, and a control of down-openloop electric power.

37 denotes a Common Radio Resource Management which performs radio network environmental measurement collection and optimization of network load.

38 denotes a Paging/Broadcast which performs a flow control of broadcast/multicast of a radio bearer, a state notification of broadcast/multicast of a radio bearer, an adjustment of calling a mobile terminal in a multi-cell, and an adjustment of calling a mobile terminal.

39 denotes a UE GEO Location which performs information collection and calculation as to a location of a mobile terminal.

40 denotes a User Radio Gateway which performs segmentation, reassembly, distribution confirmation of an individual channel, header compression, multiplex/separation of an individual channel, macro diversity composition/separation, control processing of up-outerloop electric power, measurement of a radio media access, and encryption of a radio channel.

41 denotes a Mobile Control which performs assignment of an individual logical radio resource, configuration management of an individual physical radio resource, control of a radio individual packet flow, adjustment of an assignment control, management of context of a radio resource, tracing, a setup/release of a connection, control of measurement of a mobile terminal, control of an up-outerloop electric power, adjustment of electric power control of down-outerloop, mapping a radio individual packet flow to a radio QoS, mapping a radio bearer to a transport QoS, location management, control of composition/separation of macro diversity, control of radio channel coding, control of media access measurement, control of a TDD timing, measurement and calculation of a radio frame distribution, an individual calling of a mobile terminal, and a handover control.

The functional model of the radio network system shown in FIG. 11 has a feature, in order to obtain flexibility, pliability and expandability, that the transport layer is completely separated from the radio network layer, and the radio network layer is divided into a Signaling Plane including each function of 36 through 39 and 41 and a Bearer Plane including each function of 35 and 40.

In the above-mentioned conventional system, the radio network layer is divided into the Signaling Plane and the Bearer Plane to define the functional block, in order to have flexibility, pliability and expandability. However, there is a problem that it has not been clarified how to proceed the load sharing when a radio network layer is realized by a plurality of apparatuses including the same functional block.

Thus, it is an object of the preferred embodiments of the present invention of the radio network system and the radio communications control method to proceed the load sharing among a plurality of apparatuses in the case of realizing one functional block by a plurality of apparatuses including the same functional block.

Moreover, it is another object of the preferred embodiments of the present invention of the radio network system and the radio communications control method to efficiently perform the load sharing of a plurality of Radio Bearer Servers which realize the function of the Bearer Plane (user plane).

DISCLOSURE OF THE INVENTION

A radio network system according to the present invention has features that at a radio network including a plurality of Radio Bearer Servers (hereafter "RBSs") which controls transfer of data communicated between a communication terminal and a radio base station, and at least one Radio Control Server (hereafter "RCS") which controls the plurality of RBSs, each of the plurality of RBSs notifies the RCS of a resource using state indicating a using state of a resource which controls the transfer of the data, and the RCS holds resource using states notified by the plurality of RBSs, receives a call, selects one RBS from the plurality of RBSs based on the resource using states, and assigns the call to a selected RBS.

Each of the plurality of RBSs has a feature that, by using a channel which controls the transfer of the data, each of the plurality of RBSs notifies the RCS of a using state of the channel and a transmission speed per unit time of the communication terminal as the resource using state.

Each of the plurality of RBSs has a feature that, by using a channel which controls the transfer of the data, each of the plurality of RBSs notifies the RCS of a using state of the channel and a transmission amount per unit time of the communication terminal as the resource using state.

Each of the plurality of RBSs has a feature of setting up a threshold value for judging whether to notify the resource using state, and notifying the RCS of the resource using state when the resource using state exceeds the threshold value.

Each of the plurality of RBSs has a feature of notifying the RCS of the resource using state by using a message corresponding to Megaco/H.248.

Each of the plurality of RBSs has a feature of notifying the RCS of the resource using state by using an Internet Protocol multicast (IP Multicast Packet).

The radio network system has a feature that the radio network system includes a plurality of RCSs, and each of the plurality of RBSs notifies each of the plurality of RCSs of the resource using state.

The RCS has a feature of analyzing the resource using state and selecting a RBS which has a largest empty space from the plurality of RBSs.

A radio network system according to the present invention has features that at a radio network including at least one Cell Control Radio Bearer Server (hereafter "CRBS") which controls transfer of data communicated between a communication terminal and a radio base station by using a common channel, a plurality of Serving Radio Bearer Servers (hereafter "SRBSs") which controls transfer of data communicated between the communication terminal and the radio base station by using an individual channel, and at least one Radio Control Server (hereafter "RCS") which receives a call, each of the plurality of SRBSs notifies the CRBS of a resource using state indicating a using state of the individual channel, the RCS transmits a request for selecting a SRBS, to which the call received is assigned, to the CRBS, the CRBS holds resource using states notified by each of the plurality of SRBSs, receives the request from the RCS, selects one SRBS from the plurality of SRBSs based on the resource using states, and notifies the RCS of a selected SRBS, and the RCS assigns the call received to the selected SRBS.

Each of the plurality of SRBSs has a feature of setting up a threshold value for judging whether to notify the resource using state, and notifying the CRBS of the resource using state receiving the call, transmitting a request for selecting a SRBS, to which the call is assigned, to the CRBS from the RCS, receiving the request from the RCS, selecting one SRBS from the plurality of SRBSs based on the resource using states, notifying a selected SRBS to the RCS, and assigning the call to the selected SRBS.

BEST MODE FOR CARRYING OUT THE INVENTION

Embodiment 1

Figure 1:
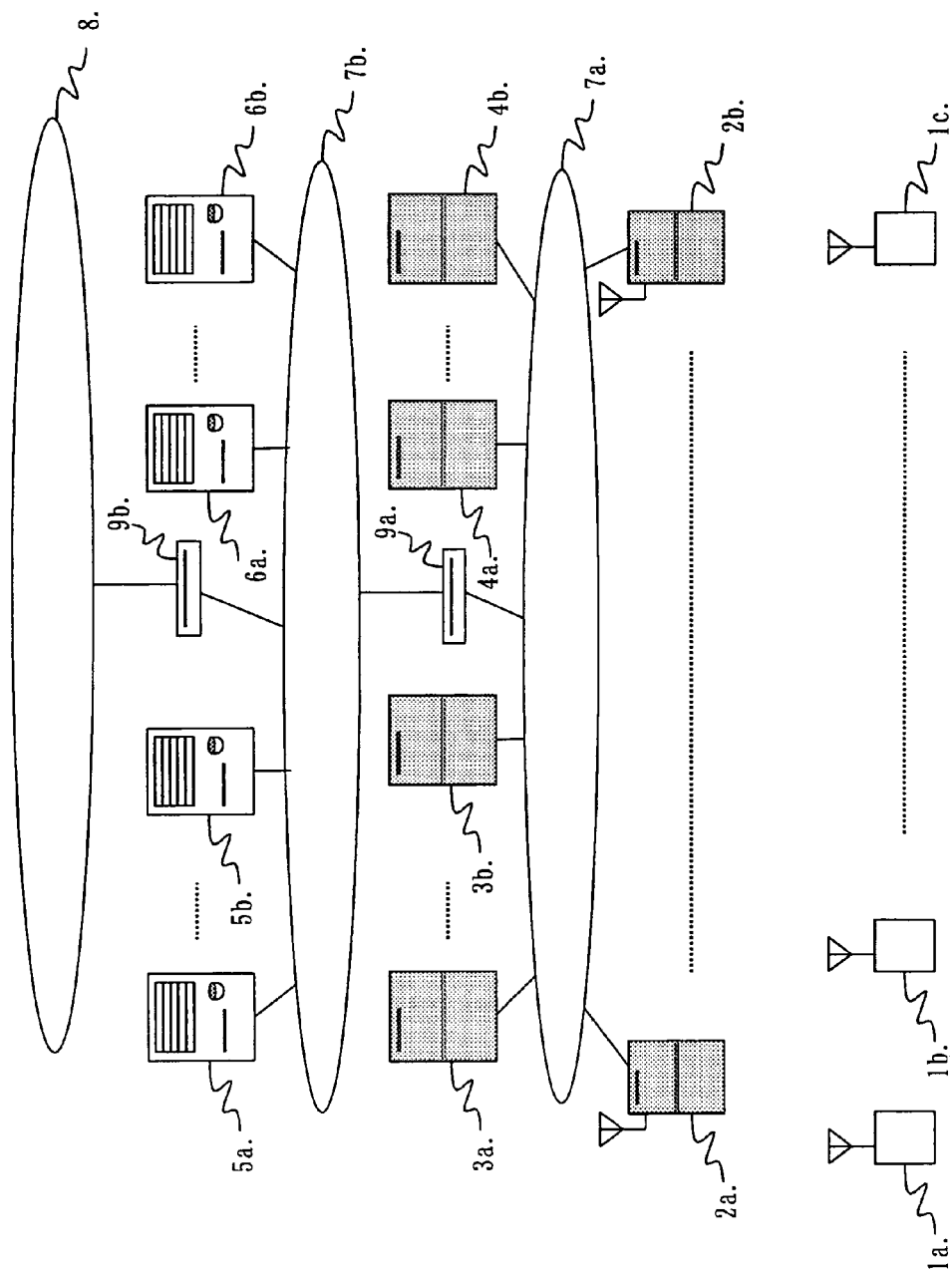
FIG. 1 is a figure showing an example of a configuration of a radio network system.

In Embodiment 1, will be explained the radio network system and the radio communications control method in which each of a plurality of Radio Bearer Servers notifies a plurality of Radio Control Servers of a resource (channel) using state, and the Radio Control Server judges a using state of each Radio Bearer Server based on the notification of the resource (channel) using state and assigns a new call to a Radio Bearer Server whose resource (channel) has the largest empty space.

The following terms are used in this specification.

1) RBS : Radio Bearer Server

It is an apparatus which performs multiplex/separation of user data, encryption, and user data transmission processing, such as a macro diversity.

2) RCS : Radio Control Server

It is an apparatus which performs controlling of RBS, and controlling of radio resources, such as a frequency, a diffusion code, and a transmission electric power.

3) Common Channel

This channel is for transmitting data not concerning a specific mobile terminal, and is shared to be used among a plurality of mobile terminals.

4) Individual Channel

This channel is for transmitting data concerning a specific mobile terminal

5) Control Plane

This plane (an aggregation of interfaces, functional blocks, etc.), also called a Signaling Plane, is for transmitting various control information for transferring user data.

6) User Plane

This plane (an aggregation of interfaces, functional blocks, etc.), also called a Bearer Plane, is for transmitting user data (data information), such as a speech and a packet.

7) Resource (Channel) Using State

Resource using state indicates a using state of a resource which controls data transmission, in RBS. The resource using state includes an identifier and the number of channels which are not being used, for example. The identifier is an ID (Identification Number) for identifying (specifying) a Serving Radio Bearer Server.

The resource includes a channel, and a physical attribute of a channel (for example, a frequency, a diffusion code, transmission electric power). A channel including attributes of the channel can be called a radio resource. The resource (channel) using state is the same as the when the resource using state exceeds the threshold value.

It is a feature that the CRBS includes a storage area which the plurality of SRBSs can access, each of the plurality of SRBSs writes the resource using state in the storage area, and the CRBS acquires the resource using state from the storage area.

The radio network system has a feature that the radio network system includes a plurality of CRBSs, and each of the plurality of SRBSs notifies each of the plurality of CRBSs of the resource using state.

The CRBS has a feature of analyzing the resource using state and selecting a SRBS which has a largest empty space from the plurality of SRBSs.

A radio communication control method according to the present invention has features that at a radio network including a plurality of Radio Bearer Servers (hereafter "RBSs") which controls transfer of data communicated between a communication terminal and a radio base station, and at least one Radio Control Server (hereafter "RCS") which controls the RBSs, the radio communication control method comprises:

notifying a resource using state indicating a using state of a resource which controls the transfer of the data, to the RCS from each of the plurality of RBSs, holding resource using states notified by the plurality of RBSs, in the RCS, receiving a call, selecting one RBS from the plurality of RBSs, based on the resource using states held in the RCS, and assigning the call to a selected RBS.

A radio communication control method according to the present invention has features that at a radio network including at least one Cell Control Radio Bearer Server (hereafter "CRBS") which controls transfer of data communicated between a communication terminal and a radio base station by using a common channel, a plurality of Serving Radio Bearer Servers (hereafter "SRBSs") which controls transfer of data communicated between the communication terminal and the radio base station by using an individual channel, and at least one Radio Control Server (hereafter "RCS") which receives a call, the radio communication control method comprises:

notifying a resource using state indicating a using state of the individual channel, to the CRBS from each of the plurality of SRBSs, holding resource using states notified by each of the plurality of SRBSs, in the CRBS, using state of Radio Control Server itself.

In addition, a plurality of Radio Bearer Servers performs data transmission control between a mobile terminal and a user plane (Bearer Plane).

Moreover, the Radio Control Server controls receiving a new call. In the configuration of FIG. 1, a new call is transmitted to either of a plurality of Serving Radio Control Servers 6a through 6b. In the embodiment of this specification, the case of a new call being transmitted to the Serving Radio Control Server 6a will be explained as an example.

FIG. 1 shows an example of a configuration of the radio network system. In FIG. 1, 1a, 1b through 1c denote mobile terminals, 2a through 2b denote radio base stations, 3a through 3b denote Cell Control Radio Bearer Servers which perform data transmission control per common channel unit, 4a through 4b denote Serving Radio Bearer Servers which perform data transmission control per individual channel unit, 5a through 5b denote Cell Control Radio Control Servers which control a radio line of the control plane corresponding to the common channel, 6a through 6b denote Serving Radio Control Servers which control a radio line of the control plane corresponding to the individual channel, 7a denotes an IP (Internet Protocol) backbone network which accommodates the radio base station, the Cell Control Radio Bearer Server and the Serving Radio Bearer Server, and 7b denotes an IP backbone network which accommodates the Cell Control Radio Control Server and the Serving Radio Control Server.

8 denotes a core network of a mobile communications network, 9a denotes a router which connects the IP backbone network 7a accommodating the radio base station, the Cell Control Radio Bearer Servers 3a through 3b and the Serving Radio Bearer Servers 4a through 4b to the IP backbone network 7b accommodating the Cell Control Radio Control Servers 5a through 5b and the Serving Radio Control Servers 6a through 6b, and 9b denotes a router which connects the IP backbone network 7b accommodating the Cell Control Radio Control Servers 5a through 5b and the Serving Radio Control Servers 6a through 6b to the core network 8 of the mobile communications network.

Figure 2:
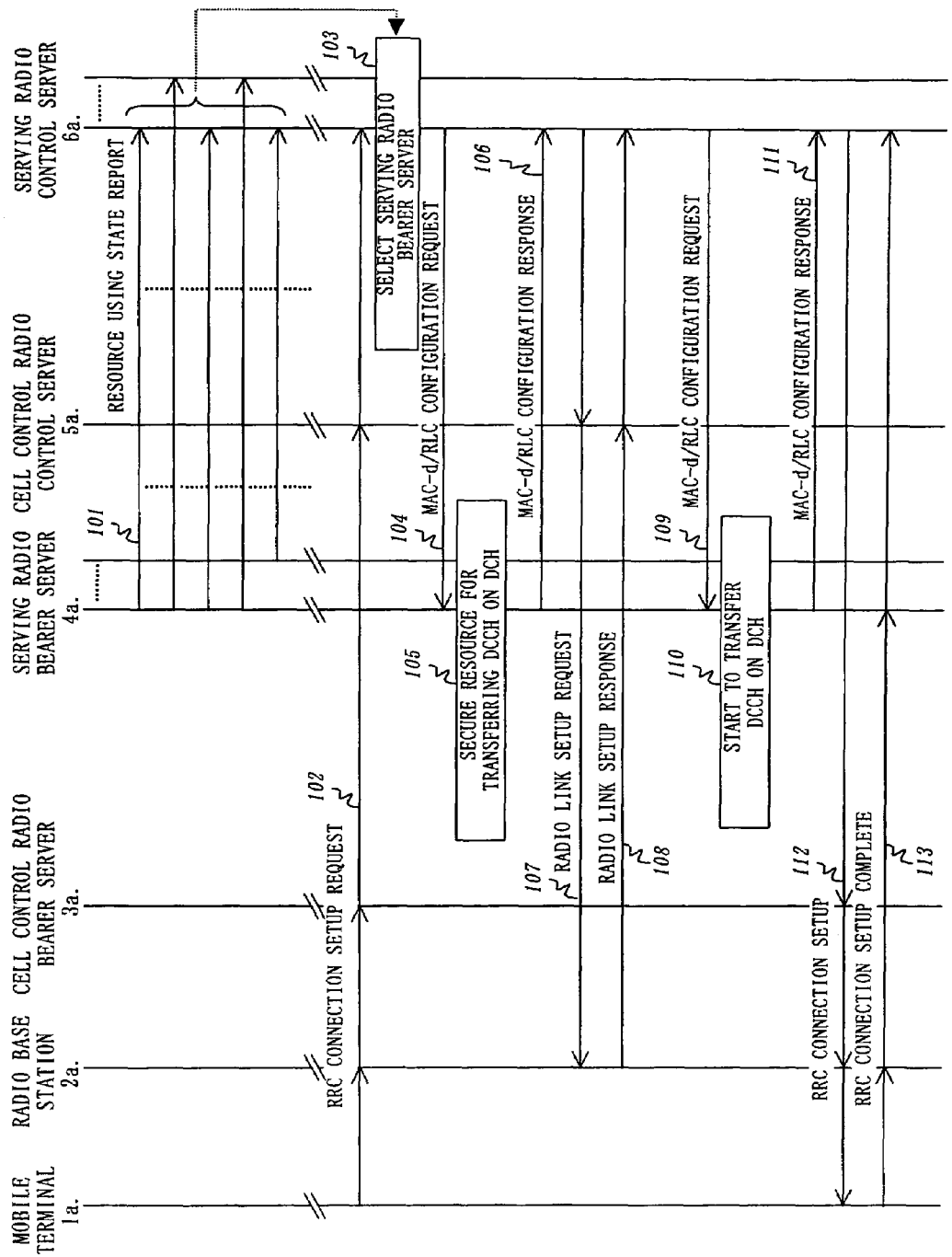
FIG. 2 is a sequence figure for explaining operations of the radio network system according to Embodiment 1.

FIG. 2 shows sequence operations of the radio network system according to the present embodiment. Based on this figure showing sequence operations, the radio network system according to the present embodiment will be explained.

Each of the Serving Radio Bearer Servers 4a through 4b always executes a resource using state report (101) to each of the Serving Radio Control Servers 6a through 6b in a specific cycle. Therefore, each of the plural Serving Radio Control Servers 6a through 6b holds a plurality of resource using states corresponding to the number of the Serving Radio Bearer Servers 4a through 4b.

When receiving a new call, each of the plural Serving Radio Control Servers 6a through 6b selects a Serving Radio Bearer Server whose resource (channel) has the largest empty space based on the holding resource using states. In the embodiment of this specification, a sequence operation will be explained referring to the case of the Serving Radio Bearer Server 4a having the resource including the largest empty space, as an example.

With the operation of transmitting or receiving a signal, the mobile terminal 1a transmits an RRC Connection Setup Request (102) by using a common control channel (CCCH), through the radio base station 2a, the Cell Control Radio Bearer Server 3a, and the Cell Control Radio Control Server 5a. When receiving the RRC Connection Setup, the Serving Control Radio Control Server 6a selects the Serving Radio Bearer Server 4a whose resource (channel) has the largest empty space (103) based on the resource using state report (101). Then, the Serving Control Radio Control Server 6a transmits a MAC-d/RLC configuration request (104) to the Serving Radio Bearer Server 4a. The MAC-d/RLC configuration request (104) is a notice requesting the mobile terminal 1a to transfer an individual control channel (DCCH) on an individual transport channel (DCH).

Receiving the MAC-d/RLC configuration request (104), the Serving Radio Bearer Server 4a secures a resource for transferring the individual control channel (DCCH) on the individual transport channel (DCH) (105), and transmits a MAC-d/RLC configuration response (106) to the Serving Radio Control Server 6a. By receiving the MAC-d/RLC configuration response (106), the Serving Radio Control Server 6a judges that the resource for transferring the individual control channel (DCCH) has been secured, and transmits a Radio Link Setup Request (107) to the radio base station 2a through the Cell Control Radio Control Server 5a. The resource for transferring an individual control channel (DCCH) means a hardware, a software etc. for performing a DCCH transferring process.

Receiving the Radio Link Setup Request (107), the radio base station 2a sets up a radio link for transferring the individual control channel, and transmits a Radio Link Setup Response (108) to the Serving Radio Control Server 6a through the Cell Control Radio Control Server 5a. Based on the received Radio Link Setup Response (108), the Serving Radio Control Server 6a judges that the radio link for transferring the individual control channel has been set up, and transmits a MAC-d/RLC configuration request (109) to the Serving Radio Bearer Server 4a. The MAC-d/RLC configuration request (109) is a notice requesting the Serving Radio Bearer Server 4a to execute transferring the individual control channel (DCCH) on the individual transport channel (DCH).

Receiving the MAC-d/RLC configuration request (109), the Serving Radio Bearer Server 4a starts to transfer the individual control channel (DCCH) on the individual transport channel (DCH) (110) and transmits a MAC-d/RLC configuration response (111) to the Serving Radio Control Server 6a.

Then, the Serving Radio Control Server 6a transmits an RRC Connection Setup (112) to the mobile terminal 1a through the Cell Control Radio Bearer Server 3a. Receiving the RRC Connection Setup (112), the mobile terminal 1a establishes a radio link to the radio base station 2a, and transmits an RRC Connection Setup Complete (113) to the Serving Radio Control Server 6a.

As mentioned above, since the Serving Control Radio Control Server 6a selects the Serving Radio Bearer Server 4a whose resource (channel) has the largest empty space based on the resource using state report, it becomes possible to efficiently perform load sharing among a plurality of Radio Bearer Servers which performs a data transmission control between a user plane (Bearer Plane) and a mobile terminal.

Thus, according to the radio network system and the radio communications control method of Embodiment 1, a plurality of Radio Bearer Servers always notifies a plurality of Radio Control Servers of a resource (channel) using state, and the Radio Control Server which controls receiving a new call judges a using state of each Radio Bearer Server based on the resource (channel) using state report, and assigns the new call to the Radio Bearer Server whose resource (channel) has the largest empty space.

Embodiment 2

In Embodiment 2, will be explained the radio network system in which each of a plurality of Radio Bearer Servers notifies a plurality of Radio Control Servers of a mobile terminal's transmission speed per unit time, which is needed to perform a channel switch control of a radio section, together with the resource (channel) using state.

Figure 3:
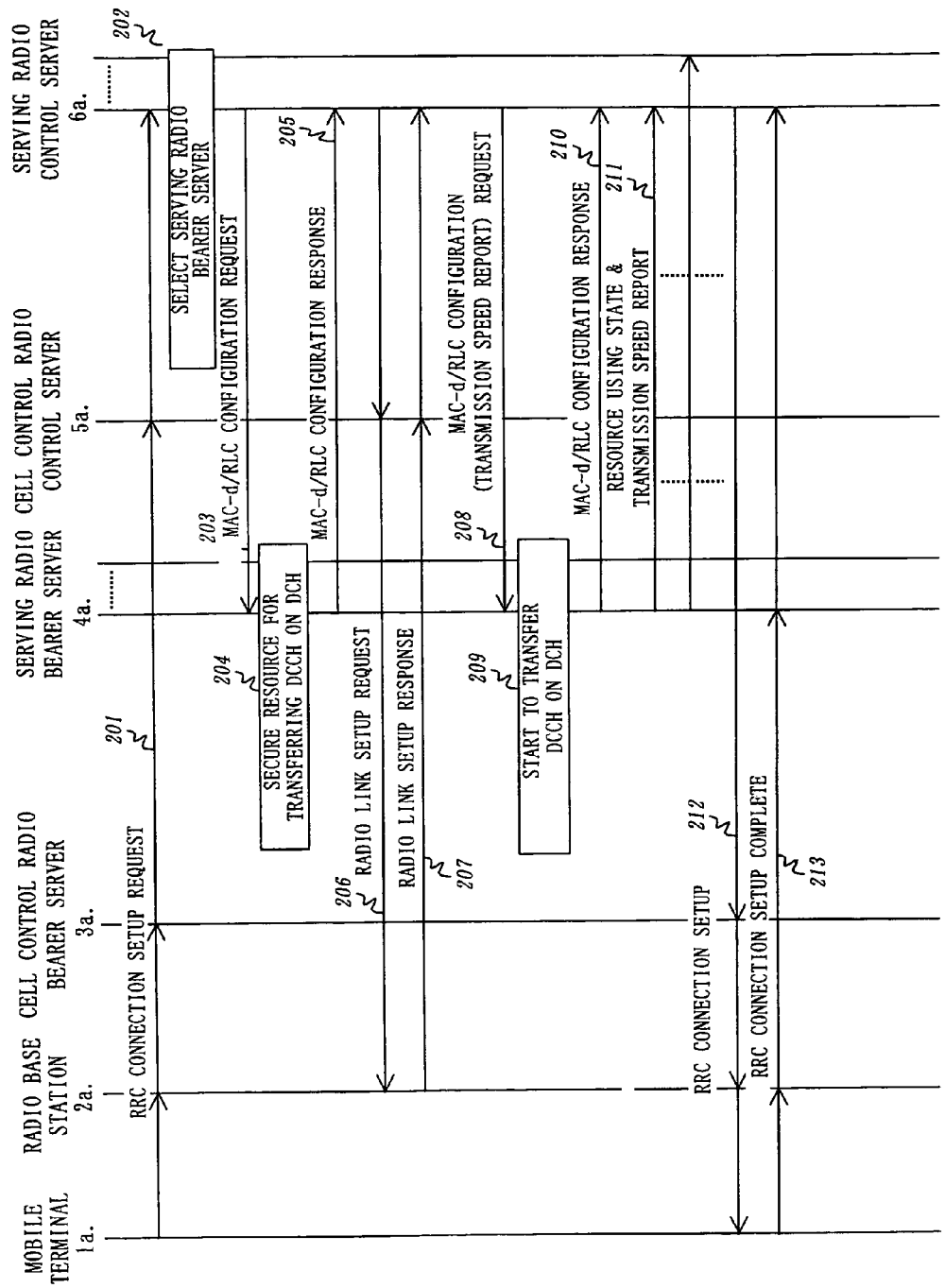
FIG. 3 is a sequence figure for explaining operations of the radio network system according to Embodiment 2.

The configuration of the radio network system according to the present embodiment is the same as that shown in FIG. 1. FIG. 3 shows sequence operations of the radio network system according to the present embodiment. Referring to the figure showing sequence operations, the radio network system of the present embodiment will now be explained.

Although not shown in FIG. 3, the respect that each of a plurality of Serving Radio Bearer Servers 4a through 4b executes a resource using state report (101 in FIG. 1) to each of a plurality of Serving Radio Control Servers 6a through 6b is the same as that in Embodiment 1. The explanation for this is herein omitted.

With the operation of transmitting or receiving a signal, the Mobile terminal 1a transmits an RRC Connection Setup Request (201) by using a common control channel (CCCH), through the radio base station 2a, the Cell Control Radio Bearer Server 3a, and the Cell Control Radio Control Server 5a. When receiving the RRC Connection Setup, the Serving Control Radio Control Server 6a selects the Serving Radio Bearer Server 4a whose resource (channel) has the largest empty space, based on the resource using state report being the same as that of Embodiment 1. (202) Then, the Serving Control Radio Control Server 6a transmits a MAC-d/RLC configuration request (203) to the Serving Radio Bearer Server 4a. The MAC-d/RLC configuration request (203) is a notice requesting the mobile terminal 1a to transfer an individual control channel (DCCH) on the individual transport channel (DCH).

Receiving the MAC-d/RLC configuration request (203), the Serving Radio Bearer Server 4a secures a resource for transferring the individual control channel (DCCH) on the individual transport channel (DCH) (204), and transmits a MAC-d/RLC configuration response (205) to the Serving Radio Control Server 6a. By receiving the MAC-d/RLC configuration response (205), the Serving Radio Control Server 6a judges that the resource for transferring the individual control channel (DCCH) has been secured, and transmits a Radio Link Setup Request (206) to the radio base station 2a through the Cell Control Radio Control Server 5a. Receiving the Radio Link Setup Request (206), the radio base station 2a sets up a radio link for transferring the individual control channel, and transmits a Radio Link Setup Response (207) to the Serving Radio Control Server 6a through the Cell Control Radio Control Server 5a.

Based on the received Radio Link Setup Response (207), the Serving Radio Control Server 6a judges that the radio link for transferring the individual control channel has been set up, and transmits a MAC-d/RLC configuration request (208) to the Serving Radio Bearer Server 4a. The MAC-d/RLC configuration request (208) is a notice requesting the Serving Radio Bearer Server 4a to execute transferring the individual control channel (DCCH) on the individual transport channel (DCH) and to report a transmission speed per unit time of the individual traffic channel (DTCH) plus the individual control channel (DCCH) between the mobile terminal 1a.

Receiving the MAC-d/RLC configuration request (208), the Serving Radio Bearer Server 4a starts to transfer the individual control channel (DCCH) on the individual transport channel (DCH) (209) and transmits a MAC-d/RLC configuration response (210) to the Serving Radio Control Server 6a. The Serving Radio Bearer Server 4a periodically executes a report of a transmission speed (211) of the mobile terminal 1a, indicated by the MAC-d/RLC configuration request (208), together with a report of a resource using state.

Then, the Serving Radio Control Server 6a transmits an RRC Connection Setup (212) to the mobile terminal 1a through the Cell Control Radio Bearer Server 3a. Receiving the RRC Connection Setup (212), the mobile terminal 1a establishes a radio link to the radio base station 2a, and transmits an RRC Connection Setup Complete (213) to the Serving Radio Control Server 6a.

As mentioned above, since the Serving Control Radio Control Server 6a selects the Serving Radio Bearer Server 4a whose resource (channel) has the largest empty space based on the resource using state report, it becomes possible to efficiently perform load sharing among a plurality of Radio Bearer Servers which performs a data transmission control between a user plane (Bearer Plane) and a mobile terminal.

Thus, according to the radio network system and the radio communications control method of Embodiment 2, a plurality of Radio Bearer Servers notifies a plurality of Radio Control Servers of a mobile terminal's transmission speed per unit time, which is needed to perform a channel switch control of a radio section, together with the resource (channel) using state.

Embodiment 3

In Embodiment 3, will be explained the radio network system in which each of a plurality of Radio Bearer Servers notifies a plurality of Radio Control Servers of a mobile terminal's transmission amount per unit time, which is needed to perform a rate switch control of a radio section, together with the resource (channel) using state.

Figure 4:
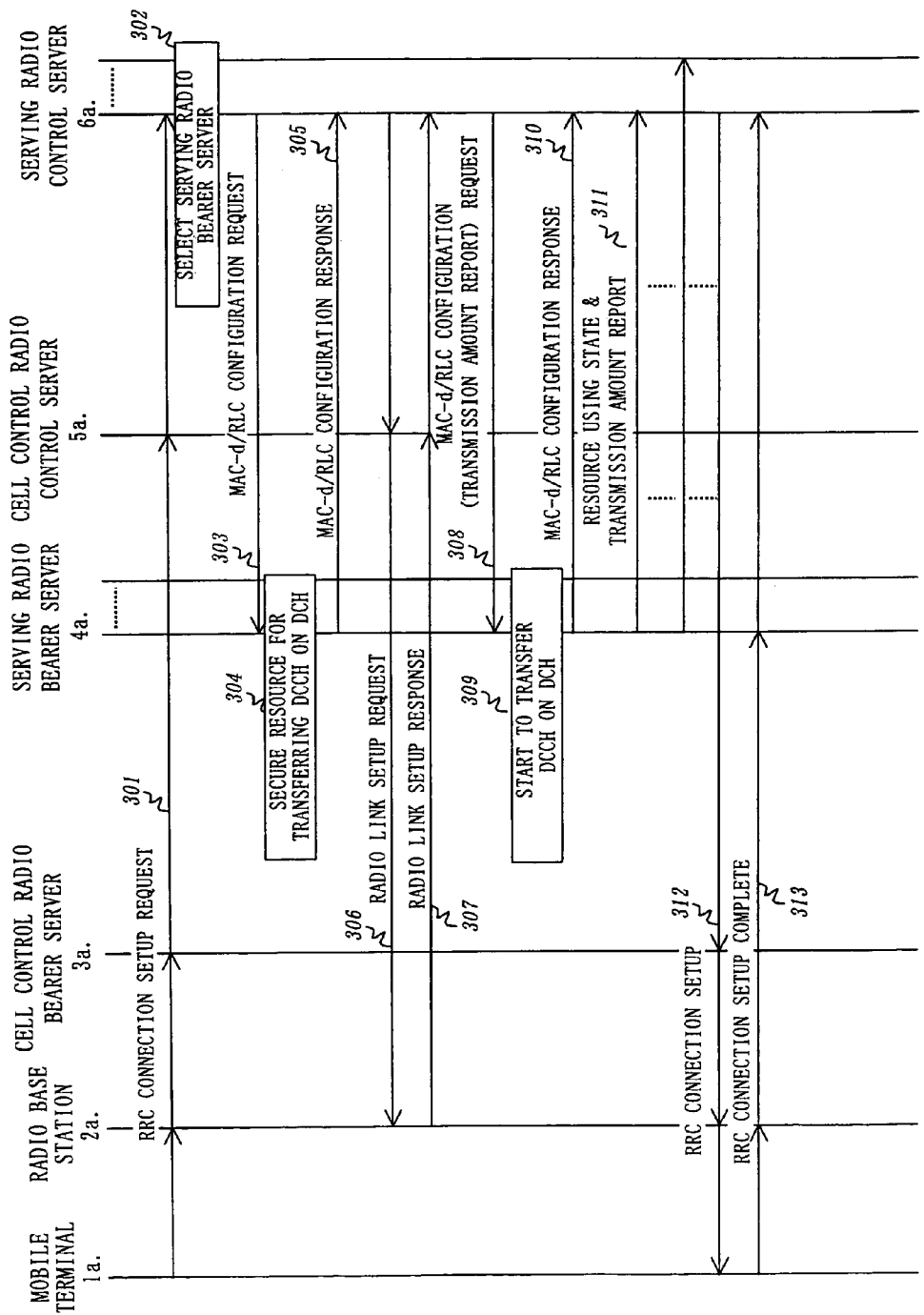
FIG. 4 is a sequence figure for explaining operations of the radio network system according to Embodiment 3.

The configuration of the radio network system according to the present embodiment is the same as that shown in FIG. 1. FIG. 4 shows sequence operations of the radio network system according to the present embodiment. Referring to the figure showing sequence operations, the radio network system of the present embodiment will now be explained.

Although not shown in FIG. 4, the respect that each of a plurality of Serving Radio Bearer Servers 4a through 4b executes a resource using state report (101 in FIG. 1) to each of a plurality of Serving Radio Control Servers 6a through 6b is the same as that in Embodiment 1. The explanation for this is herein omitted.

With the operation of transmitting or receiving a signal, the mobile terminal 1a transmits an RRC Connection Setup Request (301) by using a common control channel (CCCH), through the radio base station 2a, the Cell Control Radio Bearer Server 3a, and the Cell Control Radio Control Server 5a. When receiving the RRC Connection Setup, the Serving Control Radio Control Server 6a selects the Serving Radio Bearer Server 4a whose resource (channel) has the largest empty space based on the resource using state report being the same as that of Embodiment 1. (302) Then, the Serving Control Radio Control Server 6a transmits a MAC-d/RLC configuration request (303) to the Serving Radio Bearer Server 4a. The MAC-d/RLC configuration request (303) is a notice requesting the mobile terminal 1a to transfer an individual control channel (DCCH) on the individual transport channel (DCH).

Receiving the MAC-d/RLC configuration request (303), the Serving Radio Bearer Server 4a secures a resource for transferring the individual control channel (DCCH) on the individual transport channel (DCH) (304), and transmits a MAC-d/RLC configuration response (305) to the Serving Radio Control Server 6a.

By receiving the MAC-d/RLC configuration response (305), the Serving Radio Control Server 6a judges that the resource for transferring the individual control channel (DCCH) has been secured, and transmits a Radio Link Setup Request (306) to the radio base station 2a through the Cell Control Radio Control Server 5a. Receiving the Radio Link Setup Request (306), the radio base station 2a sets up a radio link for transferring the individual control channel, and transmits a Radio Link Setup Response (307) to the Serving Radio Control Server 6a through the Cell Control Radio Control Server 5a.

Based on the received Radio Link Setup Response (307), the Serving Radio Control Server 6a judges that the radio link for transferring the individual control channel has been set up, and transmits a MAC-d/RLC configuration request (308) to the Serving Radio Bearer Server 4a. The MAC-d/RLC configuration request (308) is a notice requesting the Serving Radio Bearer Server 4a to execute transferring the individual control channel (DCCH) on the individual transport channel (DCH) and to report a transmission amount per unit time of the individual traffic channel (DTCH) plus the individual control channel (DCCH) between the mobile terminal 1a.

Receiving the MAC-d/RLC configuration request (308), the Serving Radio Bearer Server 4a starts to transfer the individual control channel (DCCH) on the individual transport channel (DCH) (309) and transmits a MAC-d/RLC configuration response (310) to the Serving Radio Control Server 6a. The Serving Radio Bearer Server 4a periodically executes a report of the transmission amount (311) of the mobile terminal 1a indicated by the MAC-d/RLC configuration request (308), together with a report of a resource using state.

Then, the Serving Radio Control Server 6a transmits an RRC Connection Setup (312) to the mobile terminal 1a through the Cell Control Radio Bearer Server 3a. Receiving the RRC Connection Setup (312), the mobile terminal 1a establishes a radio link to the radio base station 2a, and transmits an RRC Connection Setup Complete (313) to the Serving Radio Control Server 6a.

As mentioned above, since the Serving Control Radio Control Server 6a selects the Serving Radio Bearer Server 4a whose resource (channel) has the largest empty space based on the resource using state report, it becomes possible to efficiently perform load sharing among a plurality of Radio Bearer Servers which performs a data transmission control between a user plane (Bearer Plane) and a mobile terminal.

Thus, according to the radio network system and the radio communications control method of Embodiment 3, a plurality of Radio Bearer Servers notifies a plurality of Radio Control Servers of a mobile terminal's transmission amount per unit time, which is needed to perform a rate switch control of a radio section, together with the resource (channel) using state.

Embodiment 4

In Embodiment 4, will be explained the radio network system in which a threshold value for judging whether a resource (channel) using state is to be notified or not has been set up in advance for each of a plurality of Radio Bearer Servers, and only when the threshold value is exceeded, the resource (channel) using state is reported.

Figure 5:
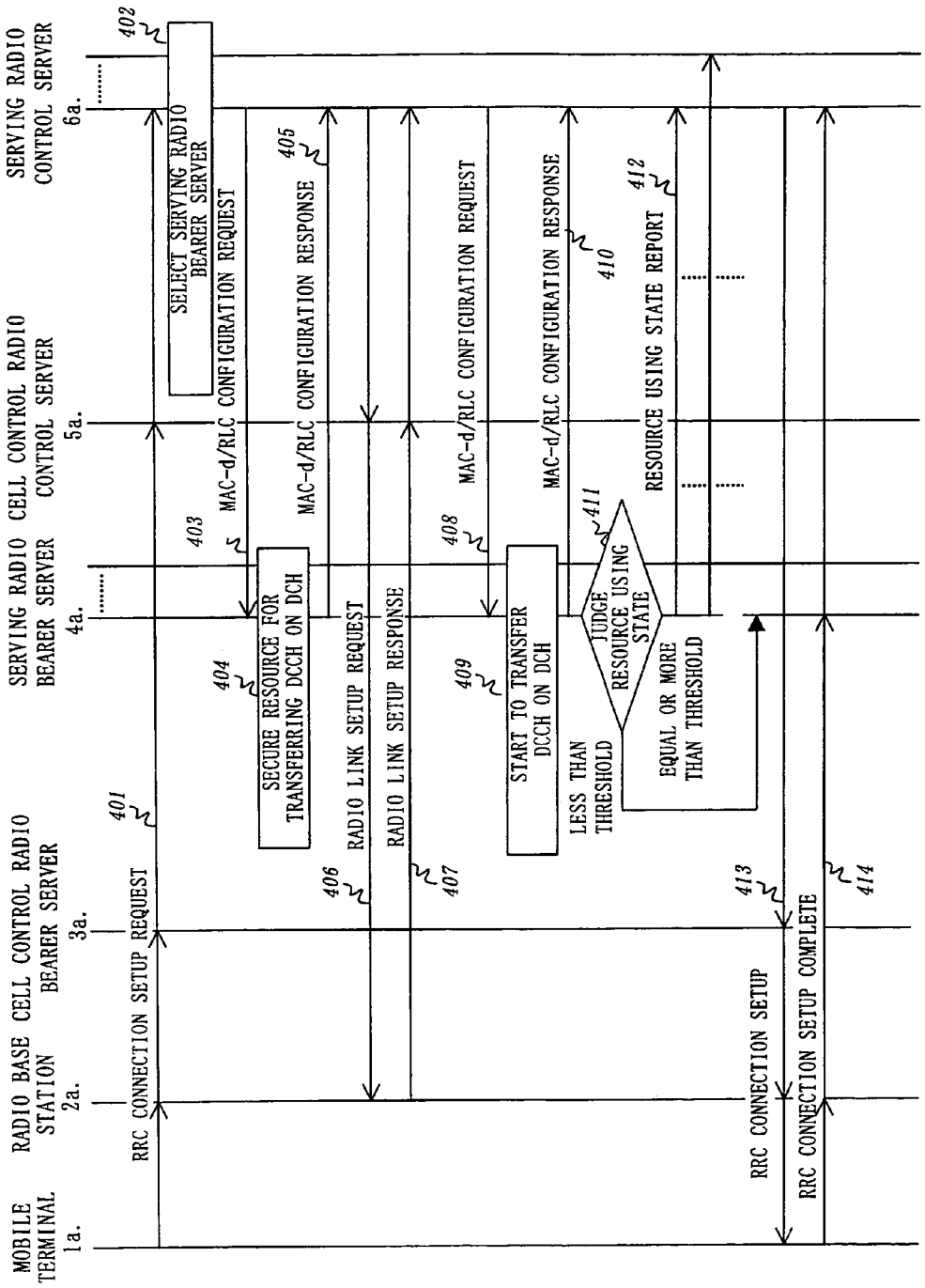
FIG. 5 is a sequence figure for explaining operations of the radio network system according to Embodiment 4.

The configuration of the radio network system according to the present embodiment is the same as that shown in FIG. 1. FIG. 5 shows sequence operations of the radio network system according to the present embodiment. Referring to the figure showing sequence operations, the radio network system of the present embodiment will now be explained.

Although not shown in FIG. 5, the respect that each of a plurality of Serving Radio Bearer Servers 4a through 4b executes a resource using state report (101 in FIG. 1) to each of a plurality of Serving Radio Control Servers 6a through 6b is the same as that in Embodiment 1. The explanation for this is herein omitted.

With the operation of transmitting or receiving a signal, the mobile terminal 1a transmits an RRC Connection Setup Request (401) by using a common control channel (CCCH), through the radio base station 2a, the Cell Control Radio Bearer Server 3a, and the Cell Control Radio Control Server 5a. When receiving the RRC Connection Setup, the Serving Control Radio Control Server 6a selects the Serving Radio Bearer Server 4a whose resource (channel) has the largest empty space. (402) Then, the Serving Control Radio Control Server 6a transmits a MAC-d/RLC configuration request (403) to the Serving Radio Bearer Server 4a, in order to make the mobile terminal 1a transfer an individual control channel (DCCH) on the individual transport channel (DCH).

Receiving the MAC-d/RLC configuration request (403), the Serving Radio Bearer Server 4a secures a resource for transferring the individual control channel (DCCH) on the individual transport channel (DCH) (404), and transmits a MAC-d/RLC configuration response (405) to the Serving Radio Control Server 6a.

By receiving the MAC-d/RLC configuration response (405), the Serving Radio Control Server 6a judges that the resource for transferring the individual control channel (DCCH) has been secured, and transmits a Radio Link Setup Request (406) to the radio base station 2a through the Cell Control Radio Control Server 5a. Receiving the Radio Link Setup Request (406), the radio base station 2a sets up a radio link for transferring the individual control channel, and transmits a Radio Link Setup Response (407) to the Serving Radio Control Server 6a through the Cell Control Radio Control Server 5a.

Based on the received Radio Link Setup Response (407), the Serving Radio Control Server 6a judges that the radio link for transferring the individual control channel has been set up, and transmits a MAC-d/RLC configuration request (408) to the Serving Radio Bearer Server 4a. The MAC-d/RLC configuration request (408) is a notice requesting the Serving Radio Bearer Server 4a to execute transferring the individual control channel (DCCH) on the individual transport channel (DCH) and to report a transmission amount per unit time of the individual traffic channel (DTCH) plus the individual control channel (DCCH) between the mobile terminal 1a.

Receiving the MAC-d/RLC configuration request (408), the Serving Radio Bearer Server 4a starts to transfer the individual control channel (DCCH) on the individual transport channel (DCH) (409) and transmits a MAC-d/RLC configuration response (410) to the Serving Radio Control Server 6a. The Serving Radio Bearer Server 4a judges the resource using state (411), and when the resource using state is equal to or more than the threshold value, executes a resource using state report (412) to each Serving Radio Control Server in a specific cycle. When the resource using state is less than the threshold value, no resource using state report (412) is executed.

Then, the Serving Radio Control Server 6a transmits an RRC Connection Setup (413) to the mobile terminal 1a through the Cell Control Radio Bearer Server 3a. Receiving the RRC Connection Setup (413), the mobile terminal 1a establishes a radio link to the radio base station 2a, and transmits an RRC Connection Setup Complete (414) to the Serving Radio Control Server 6a.

As mentioned above, since the Serving Control Radio Control Server 6a selects the Serving Radio Bearer Server 4a whose resource (channel) has the largest empty space based on the resource using state report, it becomes possible to efficiently perform load sharing among a plurality of Radio Bearer Servers which performs a data transmission control between a user plane (Bearer Plane) and a mobile terminal.

The number of channels being open can be used as the threshold value. Moreover, when a transmission speed (explained in Embodiment 2), or a transmission amount (explained in Embodiment 3) is included in the resource (channel) using state, the value of the transmission speed or the transmission amount can be used as the threshold value.

Thus, according to the radio network system and the radio communications control method of Embodiment 4, when a plurality of Radio Bearer Servers notifies a plurality of Radio Control Servers of a resource (channel) using state, a threshold value for judging whether a resource (channel) using state is to be notified or not has been set up in advance, and only when the threshold value is exceeded the resource (channel) using state is notified.

Embodiment 5

In Embodiment 5, will be explained the radio network system in which each of a plurality of Serving Radio Bearer Servers notifies a plurality of Cell Control Radio Bearer Servers of a resource (channel) using state, the Radio Control Server controls receiving a new call and when receiving the new call, requests the Cell Control Radio Bearer Server to transfer data of a user plane, and the Cell Control Radio Bearer Server judges a using state of each Serving Radio Bearer Server based on the resource (channel) using state report and assigns the request for transferring data of the user plane to a Serving Radio Bearer Server whose resource (channel) has the largest empty space.

Figure 6:
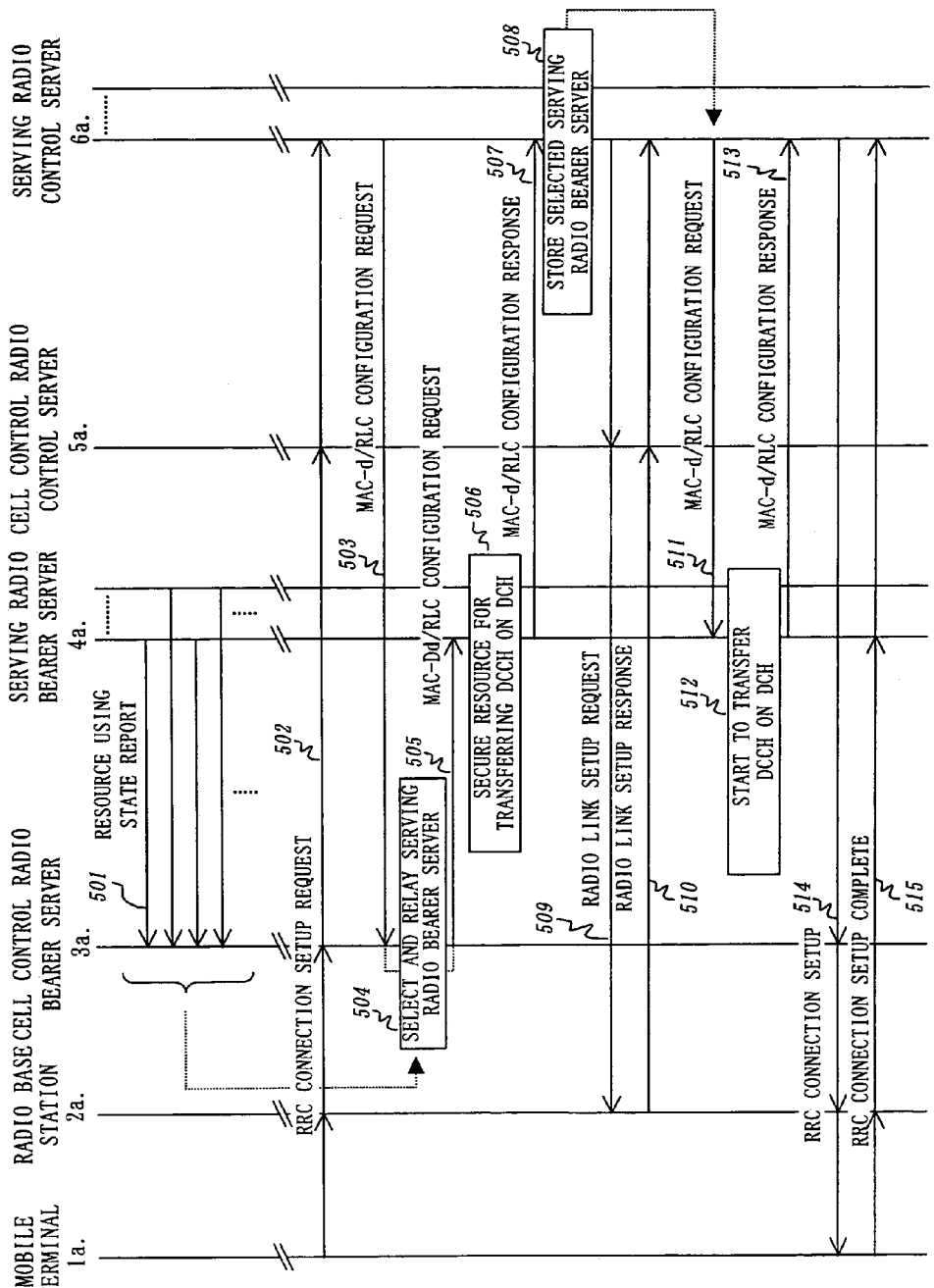
FIG. 6 is a sequence figure for explaining operations of the radio network system according to Embodiment 5.

The configuration of the radio network system according to the present embodiment is the same as that shown in FIG. 1. FIG. 6 shows sequence operations of the radio network system according to the present embodiment. Referring to the figure showing sequence operations, the radio network system of the present embodiment will now be explained.

Each of the Serving Radio Bearer Servers 4a through 4b always executes a resource using state report (501) to each of the Cell Control Radio Bearer Servers 3a through 3b in a specific cycle. Therefore, each of the plural Cell Control Radio Bearer Servers 3a through 3b holds a plurality of the resource using states corresponding to the number of the Serving Radio Bearer Servers 4a through 4b.

In addition, though one Cell Control Radio Bearer Server 3a is shown in FIG. 6, other Cell Control Radio Control Servers also receive and hold the resource using states.

With the operation of transmitting or receiving a signal, the mobile terminal 1a transmits an RRC Connection Setup Request (502) by using a common control channel (CCCH), through the radio base station 2a, the Cell Control Radio Bearer Server 3a, and the Cell Control Radio Control Server 5a. When receiving the RRC Connection Setup, the Serving Control Radio Control Server 6a transmits a MAC-d/RLC configuration request (503) to the Cell Control Radio Bearer Server 3a which transferred the RRC Connection Setup Request (502). The MAC-d/RLC configuration request (503) is a notice requesting the mobile terminal 1a to transfer an individual control channel (DCCH) on the individual transport channel (DCH).

Receiving the MAC-d/RLC configuration request (503), the Cell Control Radio Bearer Server 3a selects the Serving Radio Bearer Server 4a whose resource (channel) has the largest empty space (103), based on the resource using state report (501). Then, the Cell Control Radio Bearer Server 3a transfers the MAC-d/RLC configuration request (505) to the Serving Radio Bearer Server 4a.

Receiving the MAC-d/RLC configuration request (505), the Serving Radio Bearer Server 4a secures a resource for transferring the individual control channel (DCCH) on the individual transport channel (DCH) (506) and transmits a MAC-d/RLC configuration response (507) to the Serving Radio Control Server 6a.

Based on the received MAC-d/RLC configuration response (507), the Serving Radio Control Server 6a stores the selected Serving Radio Bearer Server 4a (508), judges that the resource for transferring an individual control channel (DCCH) has been secured, and transmits a Radio Link Setup Request (509) to the radio base station 2a through the Cell Control Radio Control Server 5a.

Receiving the Radio Link Setup Request (509), the radio base station 2a sets up a radio link for transferring the individual control channel, and transmits a Radio Link Setup Response (510) to the Serving Radio Control Server 6a through the Cell Control Radio Control Server 5a.

Based on the received Radio Link Setup Response (510), the Serving Radio Control Server 6a judges that the radio link for transferring the individual control channel has been set up, and transmits a MAC-d/RLC configuration request (511) to the stored Serving Radio Bearer Server 4a. The MAC-d/RLC configuration request (511) is a notice requesting the Serving Radio Bearer Server 4a to execute transferring the individual control channel (DCCH) on the individual transport channel (DCH).

Receiving the MAC-d/RLC configuration request (511), the Serving Radio Bearer Server 4a starts to transfer the individual control channel (DCCH) on the individual transport channel (DCH) (512) and transmits a MAC-d/RLC configuration response (513) to the Serving Radio Control Server 6a.

Then, the Serving Radio Control Server 6a transmits an RRC Connection Setup (514) to the mobile terminal 1a through the Cell Control Radio Bearer Server 3a. Receiving the RRC Connection Setup (514), the mobile terminal 1a establishes a radio link to the radio base station 2a, and transmits an RRC connection Setup Complete (515) to the Serving Radio Control Server 6a.

As mentioned above, since the Cell Control Radio Bearer Server 3a selects the Serving Radio Bearer Server 4a whose resource (channel) has the largest empty space based on the resource using state report, it becomes possible to efficiently perform load sharing among a plurality of Radio Bearer Servers which performs a data transmission control between a user plane (Bearer Plane) and a mobile terminal.

Thus, according to the radio network system and the radio communications control method of Embodiment 5, a plurality of Serving Radio Bearer Servers always notifies a plurality of Cell Control Radio Bearer Servers of a resource (channel) using state, the Radio Control Server which controls receiving a new call requests the Cell Control Radio Bearer Server Plane to transfer data of the user plane when receiving the new call, and the Cell Control Radio Bearer Server judges a using state of each Serving Radio Bearer Server based on the resource (channel) using state report and assigns the request for transferring data of the user plane to the Serving Radio Bearer Server whose resource (channel) has the largest empty space.

Embodiment 6

In Embodiment 6, will be explained the radio network system in which a threshold value for judging whether a resource (channel) using state is to be notified or not has been set up in advance for each of a plurality of Serving Radio Bearer Servers, and only when the threshold value is exceeded, the resource (channel) using state is reported.

Figure 7:
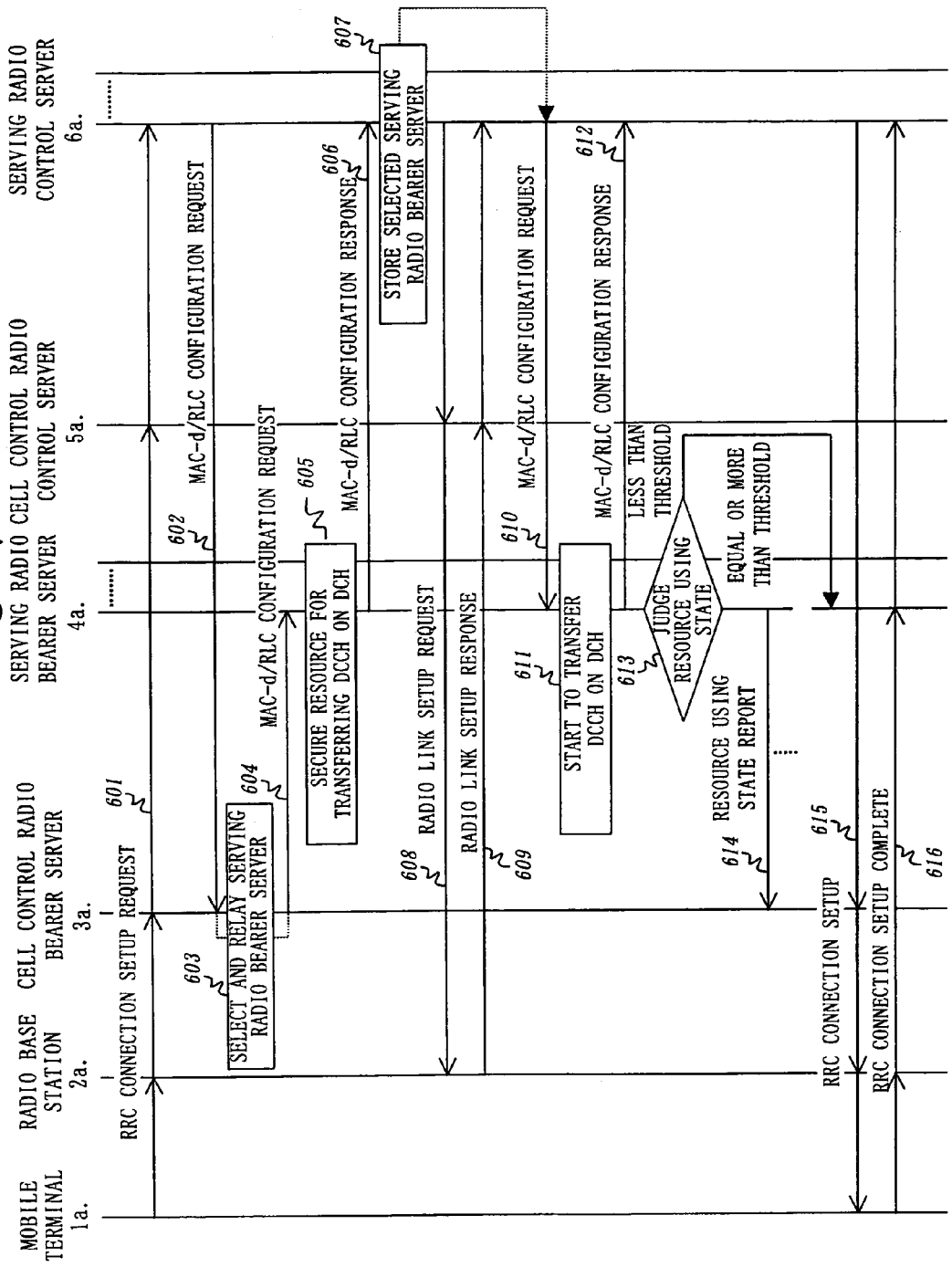
FIG. 7 is a sequence figure for explaining operations of the radio network system according to Embodiment 6.

The configuration of the radio network according to the present embodiment is the same as that shown in FIG. 1. FIG. 7 shows sequence operations of the radio network system according to the present embodiment. Referring to the figure showing sequence operations, the radio network system of the present embodiment will now be explained.

Although not shown in FIG. 7, the respect that each of a plurality of Serving Radio Bearer Servers 4a through 4b executes a resource using state report (501 in FIG. 6) to each of a plurality of Cell Control Radio Bearer Servers 3a through 3b is the same as that in Embodiment 5. The explanation for this is herein omitted.

With the operation of transmitting or receiving a signal, the mobile terminal 1a transmits an RRC Connection Setup Request (601) by using a common control channel (CCCH), through the radio base station 2a, the Cell Control Radio Bearer Server 3a, and the Cell Control Radio Control Server 5a. When receiving the RRC Connection Setup, the Serving Control Radio Control Server 6a transmits a MAC-d/RLC configuration request (602) to the Cell Control Radio Bearer Server 3a which sent the RRC Connection Setup Request (601), in order to make the mobile terminal 1a transfer an individual control channel (DCCH) on the individual transport channel (DCH).

Receiving the MAC-d/RLC configuration request (602), the Cell Control Radio Bearer Server 3a selects the Serving Radio Bearer Server 4a whose resource (channel) has the largest empty space (603), and transfers the MAC-d/RLC configuration request (604) to the Serving Radio Bearer Server 4a.

Receiving the MAC-d/RLC configuration request (604), the Serving Radio Bearer Server 4a secures a resource for transferring the individual control channel (DCCH) on the individual transport channel (DCH) (605), and transmits a MAC-d/RLC configuration response (606) to the Serving Radio Control Server 6a.

By receiving the MAC-d/RLC configuration response (606), the Serving Radio Control Server 6a stores the selected Serving Radio Bearer Server 4a (607), judges that the resource for transferring the individual control channel (DCCH) has been secured, and transmits a Radio Link Setup Request (608) to the radio base station 2a through the Cell Control Radio Control Server 5a.

Receiving the Radio Link Setup Request (608), the radio base station 2a sets up a radio link for transferring the individual control channel, and transmits a Radio Link Setup Response (609) to the Serving Radio Control Server 6a through the Cell Control Radio Control Server 5a.

Based on the received Radio Link Setup Response (609), the Serving Radio Control Server 6a judges that the radio link for transferring the individual control channel has been set up, and transmits a MAC-d/RLC configuration request (610) to the stored Serving Radio Bearer Server 4a. The MAC-d/RLC configuration request (610) is a notice requesting the Serving Radio Bearer Server 4a to execute transferring the individual control channel (DCCH) on the individual transport channel (DCH).

Receiving the MAC-d/RLC configuration request (610), the Serving Radio Bearer Server 4a starts to transfer the individual control channel (DCCH) on the individual transport channel (DCH) (611) and transmits a MAC-d/RLC configuration response (612) to the Serving Radio Control Server 6*a*. The Serving Radio Bearer Server 4*a* judges the resource using state (613), and when the resource using state is equal to or more than the threshold value, executes a resource using state report (614) to each of the Cell Control Radio Control Servers 3*a* through 3*b* in a specific cycle. When the resource using state is less than the threshold value, no resource using state report (614) is executed.

Then, the Serving Radio Control Server 6*a* transmits an RRC Connection Setup (615) to the mobile terminal 1*a* through the Cell Control Radio Bearer Server 3*a*. Receiving the RRC Connection Setup (615), the mobile terminal 1*a* establishes a radio link to the radio base station 2*a*, and transmits an RRC Connection Setup Complete (616) to the Serving Radio Control Server 6*a*.

As mentioned above, since the Cell Control Radio Bearer Server 3*a* selects the Serving Radio Bearer Server 4*a* whose resource (channel) has the largest empty space based on the resource using state report, it becomes possible to efficiently perform load sharing among a plurality of Radio Bearer Servers which performs a data transmission control between a user plane (Bearer Plane) and a mobile terminal.

Thus, according to the radio network system and the radio communications control method of Embodiment 6, when a plurality of Serving Radio Bearer Servers notifies a plurality of Cell Control Radio Bearer Servers of a resource (channel) using state, a threshold value for judging whether a resource (channel) using state is to be notified or not has been set up in advance, and only when the threshold value is exceeded the resource (channel) using state is notified.

Embodiment 7

In Embodiment 7, will be explained the radio network system in which when notifying a resource (channel) using state, each of a plurality of Serving Radio Bearer Servers sets information about the using state, in a common file area of the Cell Control Radio Bearer Server, which can be referred to from the outside.

Figure 8:
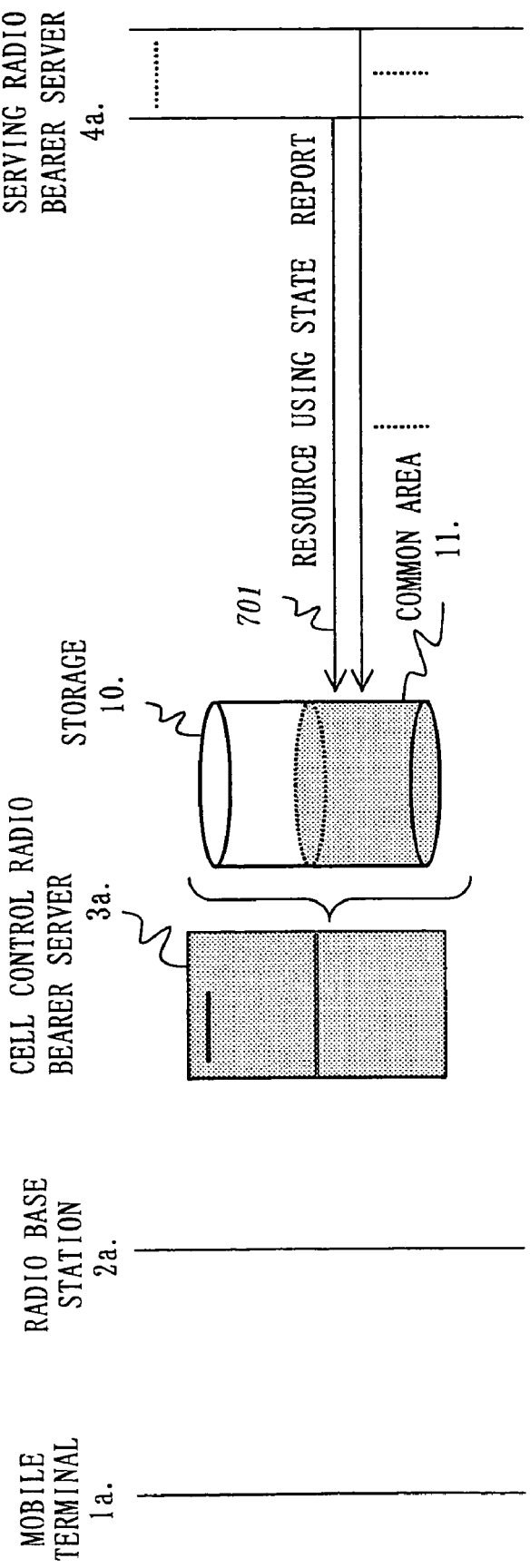
FIG. 8 is a sequence figure for explaining operations of the radio network system according to Embodiment 7.

The configuration of the radio network according to the present embodiment is the same as that shown in FIG. 1. FIG. 8 shows sequence operations of the radio network system according to the present embodiment. Referring to the figure showing sequence operations, the radio network system of the present embodiment will now be explained.

When each Serving Radio Bearer Server executes the resource using state report to the Cell Control Radio Bearer Server 3*a* as described in Embodiment 6, each Serving Radio Bearer Server directly accesses a common area 11 in a storage 10 of the Cell Control Radio Bearer Server 3*a* and executes the resource using state report (701). As other sequence operations except this are the same as those in Embodiment 6, descriptions of these are omitted.

As mentioned above, since the Cell Control Radio Bearer Server 3*a* selects the Serving Radio Bearer Server 4*a* whose resource (channel) has the largest empty space, based on the resource using state report, it becomes possible to efficiently perform load sharing among a plurality of Radio Bearer Servers which performs data transmission control between a user plane (Bearer Plane) and a mobile terminal.

Thus, according to the radio network system and the radio communications control method of Embodiment 7, when notifying the resource (channel) using state, a plurality of Serving Radio Bearer Servers sets information about the resource (channel) using state, in the common file area of the Cell Bearer Radio Control Server, which can be referred to from the outside.

Embodiment 8

In the Embodiments from 1 to 8, it is also possible to use the following system. For example, when a plurality of Radio Bearer Servers notifies a plurality of Radio Control Servers of a resource (channel) using state, a message corresponding to Megaco/H.248 is used. By dint of this, it becomes easy for the system to be used by multi vendors.

Moreover, as another example, when a plurality of Radio Bearer Servers notifies a plurality of Radio Control Servers of a resource (channel) using state, an IP Multicast Packet is used as a transferring system. By dint of this, it is possible to reduce traffic between the Radio Bearer Server and the Radio Control Server.

Embodiment 9

In Embodiments from 1 to 7, have been explained the cases in which the function of the RNC is divided into the control plane and the user plane, each of the control plane and the user plane is divided into a function using a common channel and a function using an individual channel, and each function is realized by a separate apparatus. In the present Embodiment, the case of the function of the RNC being divided into two: the control plane and the user plane will be explained.

Figure 9:
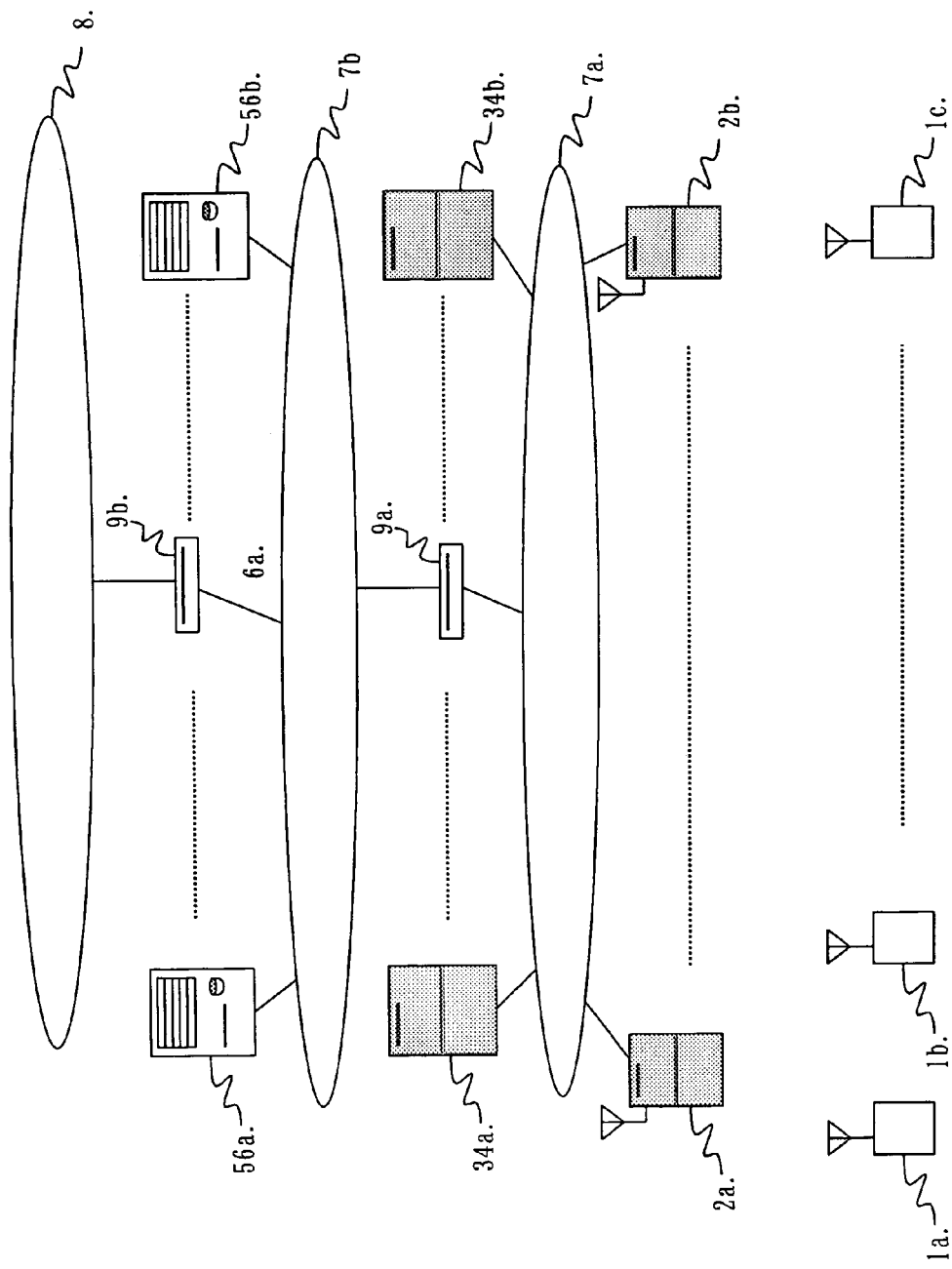
FIG. 9 is a figure showing an example of the configuration of the radio network system according to Embodiment 9.

FIG. 9 shows an example of the configuration of the radio network system according to Embodiment 9. Radio Control Servers 56*a* through 56*b* have functions corresponding to those of the Cell Control Radio Control Servers 5*a* through 5*b* and the Server Radio Control Servers 6*a* through 6*b* in FIG. 1. Radio Bearer Servers 34*a* through 34*b* have functions corresponding to those of the Cell Control Radio Bearer Servers 3*a* through 3*b* and the Serving Radio Bearer Servers 4*a* through 4*b* in FIG. 1. Since the apparatuses having the same signs as those in FIG. 1 are the same as those in FIG. 1, explanations for them are omitted.

Figure 10:
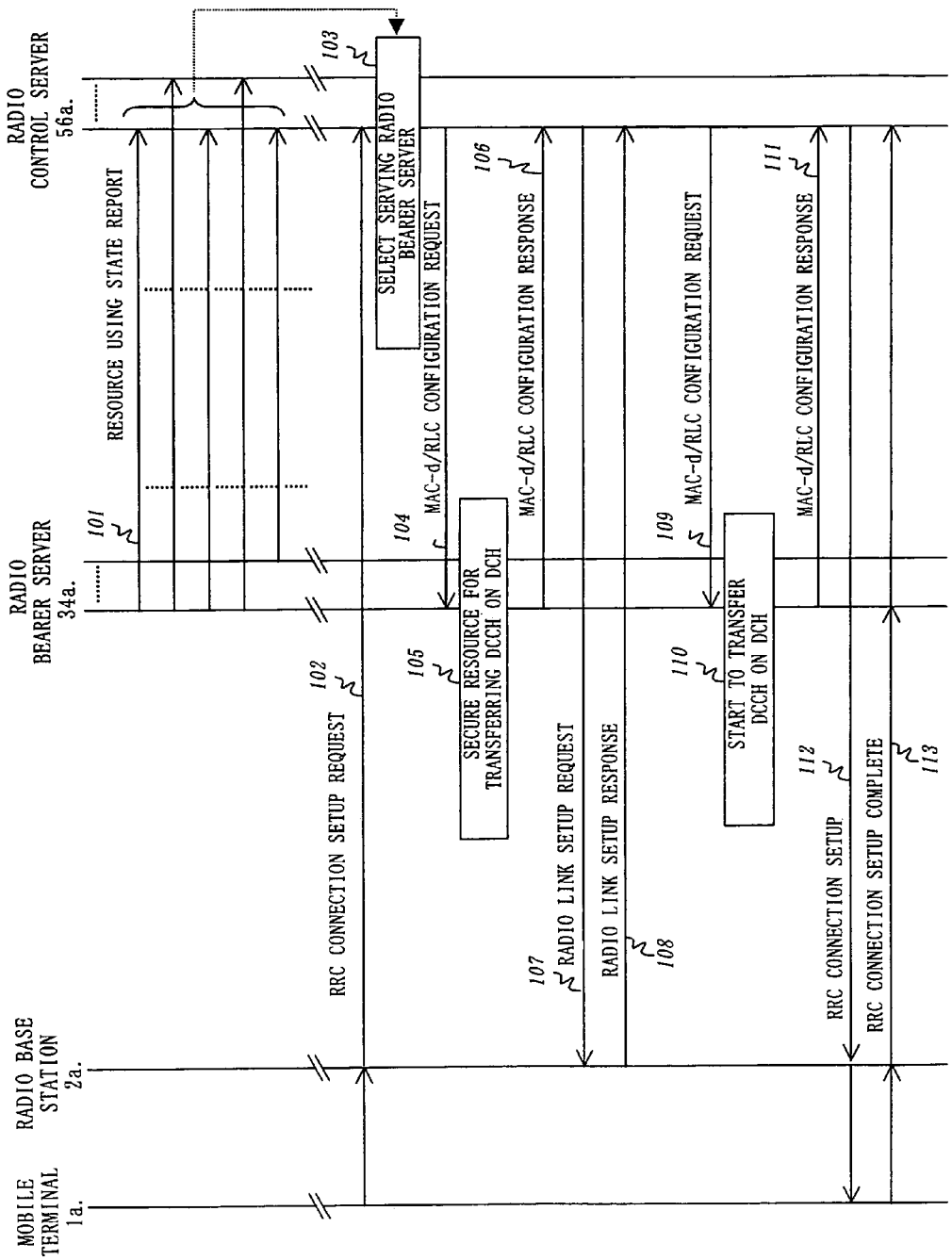
FIG. 10 is a sequence figure for explaining operations of the radio network system according to Embodiment 9.
Figure 11:
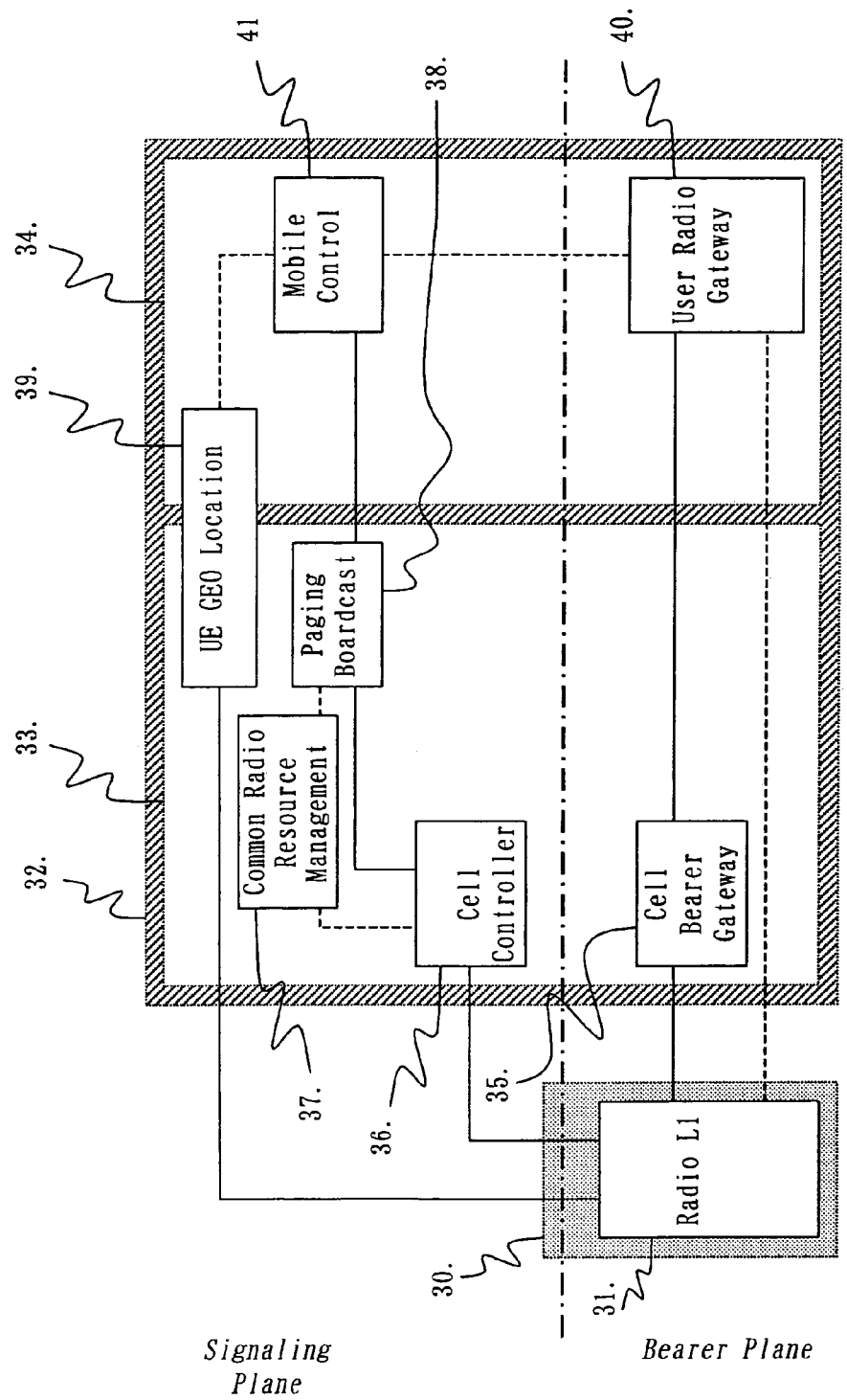
FIG. 11 is a figure showing a configuration of a conventional radio network system.

FIG. 10 is a sequence figure explaining operations of the radio network system according to Embodiment 9. The Radio Control Servers 56*a* through 56*b* perform the operations executed by the Cell Control Radio Control Servers 5*a* through 5*b* and the Server Radio Control Servers 6*a* through 6*b*. The Radio Bearer Servers 34*a* through 34*b* perform the operations executed by the Cell Control Radio Bearer Servers 3*a* through 3*b* and the Serving Radio Bearer Servers 4*a* through 4*b*.

Except for the above-mentioned points, other respects are the same as those of Embodiment 1. Thus, explanations for them are omitted.

Embodiment 10

A plurality of the Cell Control Radio Control Servers 5*a* through 5*b* and a plurality of the Serving Radio Control Servers 6*a* through 6*b* are shown in FIG. 1. However, it is also acceptable to have one Cell Control Radio Control Server and one Serving Radio Control Server. Even in the case of there being one Radio Control Server, it is possible to control a plurality of Radio Bearer Servers.

Moreover, the same point as the above can also be described in FIG. 9.

One Cell Control Radio Control Server and one Cell Control Radio Bearer Server are shown in FIGS. 2 through 7. When a plurality of them are arranged as shown in FIG. 1, each of them executes the same operation as that in FIGS. 2 through 7.

In Embodiments 1 through 9, explanations are provided by using the mobile terminal. However, it is not limited to the mobile terminal. Other apparatus can also be acceptable as long as it is a communication terminal being able to communicate with a radio base station.

INDUSTRIAL APPLICABILITY

As mentioned above, according to the preferred Embodiments of the present invention, a plurality of Radio Bearer Servers always notifies a plurality of (or at least one) Radio Control Servers of a resource (channel) using state, and the Radio Control Server which controls receiving a new call judges a using state of each Radio Bearer Server based on the notification of the resource (channel) using state and assigns the new call to a Radio Bearer Server whose resource (channel) has the largest empty space. Therefore, there is an effect that load sharing among a plurality of Radio Bearer Servers which performs a data transmission control between a user plane (Bearer Plane) and a mobile terminal can be efficiently performed.

Moreover, when necessary, a plurality of Radio Bearer Servers notifies a plurality of Radio Control Servers of a mobile terminal's transmission speed per unit time, which is needed to perform a channel switch control of a radio section, together with the resource (channel) using state. Therefore, there are effects that traffic between the Radio Bearer Server and the Radio Control Server can be reduced and the load sharing among a plurality of Radio Bearer Servers which performs a data transmission control between the user plane (Bearer Plane) and the mobile terminal can be efficiently performed.

Furthermore, when necessary, a plurality of Radio Bearer Servers notifies a plurality of Radio Control Servers of a mobile terminal's transmission amount per unit time, which is needed to perform a channel switch control of a radio section, together with the resource (channel) using state. Therefore, there are effects that traffic between the Radio Bearer Server and the Radio Control Server can be reduced and the load sharing among a plurality of Radio Bearer Servers which performs a data transmission control between the user plane (Bearer Plane) and the mobile terminal can be efficiently performed.

Moreover, when a plurality of Radio Bearer Servers notifies a plurality of Radio Control Servers of a resource (channel) using state, a threshold value for judging whether a resource (channel) using state is to be notified or not has been set up in advance, and only when the threshold value is exceeded, the resource (channel) using state is notified. Therefore, there are effects that traffic between the Radio Bearer Server and the Radio Control Server can be reduced and the load sharing among a plurality of Radio Bearer Servers which performs a data transmission control between the user plane (Bearer Plane) and the mobile terminal can be efficiently performed.

Moreover, when a plurality of Radio Bearer Servers notifies a plurality of Radio Control Servers of a resource (channel) using state, a message corresponding to Megaco/H.248 is used. Therefore, it becomes easy for the system to be used by multi vendors, and the load sharing among a plurality of Radio Bearer Servers which performs a data transmission control between the user plane (Bearer Plane) and the mobile terminal can be efficiently performed.

Furthermore, when a plurality of Radio Bearer Servers notifies a plurality of Radio Control Servers of a resource (channel) using state, an IP Multicast Packet is used as a transferring system. Therefore, there are effects that traffic between the Radio Bearer Server and the Radio Control Server can be reduced and the load sharing among a plurality of Radio Bearer Servers which performs a data transmission control between the user plane (Bearer Plane) and the mobile terminal can be efficiently performed.

Furthermore, a plurality of Serving Radio Bearer Servers always notifies a plurality of (or at least one) Cell Control Radio Bearer Servers of a resource (channel) using state, the Radio Control Server which controls receiving a new call requests the Cell Control Radio Bearer Sever, when receiving the new call, to transfer data of the user plane, and the Cell Control Radio Bearer Server judges a using state of each Serving Radio Bearer Server based on the resource (channel) using state report and assigns the request for transferring data of the user plane to the Serving Radio Bearer Server whose resource (channel) has the largest empty space. Therefore, there is an effect that load sharing among a plurality of Serving Radio Bearer Servers which performs a data transmission control between the user plane (Bearer Plane) and the mobile terminal can be efficiently performed.

Moreover, when a plurality of Serving Radio Bearer Servers notifies a plurality of Cell Control Radio Bearer Servers of a resource (channel) using state, a threshold value for judging whether a resource (channel) using state is to be notified or not has been set up in advance, and only when the threshold value is exceeded, the resource (channel) using state is notified. Therefore, there are effects that traffic between the Cell Control Radio Bearer Server and the Serving Radio Control Server can be reduced and the load sharing among a plurality of Serving Radio Bearer Servers which performs a data transmission control between the user plane (Bearer Plane) and the mobile terminal can be efficiently performed.

Furthermore, when notifying a resource (channel) using state, a plurality of Serving Radio Bearer Servers sets information about the resource (channel) using state, in a common file area of the Cell Control Radio Control Server, which can be referred to from the outside. Therefore, there are effects that traffic between the Cell Control Radio Bearer Server and the Serving Radio Control Server can be reduced and the load sharing among a plurality of Serving Radio Bearer Servers which performs a data transmission control between the user plane (Bearer Plane) and the mobile terminal can be efficiently performed.

The invention claimed is:

1. A radio network system of a radio network including a plurality of Radio Bearer Servers (hereafter "RBSs") which controls transfer of data communicated between a communication terminal and a radio base station, and at least one Radio Control Server (hereafter "RCS") which controls the plurality of RBSs,
   wherein each of the plurality of RBSs notifies the RCS of a resource using state indicating a using state of a resource which controls the transfer of the data, and
   the RCS holds resource using states notified by the plurality of RBSs, receives a call, selects one RBS from the plurality of RBSs based on the resource using states, and assigns the call to a selected RBS, wherein
   each of the plurality of RBSs sets up a threshold value for judging whether to notify the resource using state, and notifies the RCS of the resource using state when the resource using state exceeds the threshold value.

2. The radio network system of claim 1, wherein each of the plurality of RBSs, by using a channel which controls the transfer of the data, notifies the RCS of a using state of the channel and a transmission speed per unit time of the communication terminal as the resource using state.

3. The radio network system of claim 1, wherein each of the plurality of RBSs, by using a channel which controls the transfer of the data, notifies the RCS of a using state of the channel and a transmission amount per unit time of the communication terminal as the resource using state.

4. The radio network system of claim 1, wherein each of the plurality of RBSs notifies the RCS of the resource using state by using a message corresponding to Megaco/H.248.

5. The radio network system of claim 1, wherein each of the plurality of RBSs notifies the RCS of the resource using state by using an Internet Protocol multicast (IP Multicast Packet).

6. The radio network system of claim 1, wherein the radio network system includes a plurality of RCSs, and each of the plurality of RBSs notifies each of the plurality of RCSs of the resource using state.

7. The radio network system of claim 1, wherein the RCS analyzes the resource using state and selects a RBS which has a largest empty space from the plurality of RBSs.

8. A radio network system of a radio network, comprising:
at least one Cell Control Radio Bearer Server (hereafter "CRBS") configured to control transfer of data communicated between a communication terminal and a radio base station by using a common channel;
a plurality of Serving Radio Bearer Servers (hereafter "SRBSs") configured to control transfer of data communicated between the communication terminal and the radio base station by using an individual channel; and
at least one Radio Control Server (hereafter "RCS") which receives a call,
wherein each of the plurality of SRBSs notifies the CRBS of a resource using state indicating a using state of the individual channel,
the RCS transmits a request for selecting a SRBS, to which the call received is assigned, to the CRBS,
the CRBS holds resource using states notified by each of the plurality of SRBSs, receives the request from the RCS, selects one SRBS from the plurality of SRBSs based on the resource using states, and notifies the RCS of a selected SRBS, and
the RCS assigns the call received to the selected SRBS.

9. The radio network system of claim 8, wherein each of the plurality of SRBSs sets up a threshold value for judging whether to notify the resource using state, and notifies the CRBS of the resource using state when the resource using state exceeds the threshold value.

10. The radio network system of claim 8, wherein the CRBS includes a storage area which the plurality of SRBSs can access, each of the plurality of SRBSs writes the resource using state in the storage area, and the CRBS acquires the resource using state from the storage area.

11. The radio network system of claim 8, wherein the radio network system includes a plurality of CRBSs, and each of the plurality of SRBSs notifies each of the plurality of CRBSs of the resource using state.

12. The radio network system of claim 8, wherein the CRBS analyzes the resource using state and selects a SRBS which has a largest empty space from the plurality of SRBSs.

13. A radio communication control method of a radio network including a plurality of Radio Bearer Servers (hereafter "RBSs") which controls transfer of data communicated between a communication terminal and a radio base station, and at least one Radio Control Server (hereafter "RCS") which controls the RBSs, the radio communication control method comprising:

notifying a resource using state indicating a using state of a resource which controls the transfer of the data, to the RCS from each of the plurality of RBSs,
holding resource using states notified by the plurality of RBSs, in the RCS,
receiving a call,
selecting one RBS from the plurality of RBSs, based on the resource using states held in the RCS, and
assigning the call to a selected RBS, wherein
each of the plurality of RBSs sets up a threshold value for judging whether to notify the resource using state, and notifies the RCS of the resource using state when the resource using state exceeds the threshold value.

14. A radio communication control method of a radio network including at least one Cell Control Radio Bearer Server (hereafter "CRBS") which controls transfer of data communicated between a communication terminal and a radio base station by using a common channel, a plurality of Serving Radio Bearer Servers (hereafter "SRBSs") which controls transfer of data communicated between the communication terminal and the radio base station by using an individual channel, and at least one Radio Control Server (hereafter "RCS") which receives a call, the radio communication control method comprising:
notifying a resource using state indicating a using state of the individual channel, to the CRBS from each of the plurality of SRBSs,
holding resource using states notified by each of the plurality of SRBSs, in the CRBS,
receiving the call,
transmitting a request for selecting a SRBS, to which the call is assigned, to the CRBS from the RCS,
receiving the request from the RCS,
selecting one SRBS from the plurality of SRBSs based on the resource using states,
notifying a selected SRBS to the RCS, and
assigning the call to the selected SRBS.

15. A radio network system of a radio network including a Cell Control Radio Bearer Server (hereafter "CRBS") which controls transfer of data communicated between a communication terminal and a radio base station by using a common channel shared to be used among a plurality of mobile terminals, a plurality of Serving Radio Bearer Servers (hereafter "SRBSs") which control transfer of data communicated between the communication terminal and the radio base station by using an individual channel which transfers data concerning a single mobile terminal, a Cell Control Radio Control Server (hereafter "CRCS") which controls a radio line corresponding to the common channel, and a plurality of Serving Radio Control Servers (hereafter "SRCSs") which control a radio line corresponding to the individual channel, wherein
each of the plurality of SRBSs notifies each of the plurality of SRCSs of a resource using state indicating a using state of a resource which controls the transfer of the data,
each of the plurality of SRCSs holds resource using states notified by the plurality of SRBSs,
one SRCS of the plurality of SRCss receives a call from a mobile terminal through a radio base station, the CRBS and the CRCS by using the common channel, selects one SRBS from the plurality of SRBSs based on the resource using states, and transmits a request to notify assigning the call to a selected SRBS through the individual channel, and
the selected SRBS receives the request transmitted by the SRCS, and secures a resource.

16. A radio network system of a radio network including at least one Cell Control Radio Bearer Sever (hereafter "CRBS") which controls transfer of data communicated between a communication terminal and a radio base station by using a common channel shared to be used among a plurality of mobile terminals, a plurality of Serving Radio Bearer Servers (hereafter "SRBSs") which control transfer of data communicated between the communication terminal and the radio base station by using an individual channel which transfers data concerning a single mobile terminal, a Cell Control Radio Control Server (hereafter "CRCS") which controls a radio line corresponding to the common channel, and a plurality of Serving Radio Control Servers (hereafter "SRCSs") which control a radio line corresponding to the individual channel, wherein each of the plurality of SRBSs notifies the CRBS of a resource using state indicating a using state of the individual channel, one SRCS of the plurality of SRCSs receives a call from a mobile terminal through a radio base station, the CRBS and the CRCS by using the common channel, and transmits a request to select a SRBS, to which the call received is assigned, to the CRBS, the CRBS holds resource using states notified by each of the plurality of SRBSs, receives the request from the SRCS, selects one SRBS from the plurality of SRBSs based on the resource using states, and transmits a request to notify assigning the call to a selected SRBS, the selected SRBS receives the request transmitted by the CRBS, secures a resource, and transmits a response to the SRCS, and the SRCS receives the response transmitted by the selected SRBS, and assigns the call to the selected SRBS.

\* \* \* \* \*